United States Patent [19]

McElroy

[11] 4,445,251

[45] May 1, 1984

[54] ADJUSTABLE CLAMP FOR FLUID STRIPPING BAG

[76] Inventor: Lucian G. McElroy, 3315 Brocker Rd., Metamora, Mich. 48455

[21] Appl. No.: 425,685

[22] Filed: Sep. 28, 1982

[51] Int. Cl.³ .............................................. B08B 1/00
[52] U.S. Cl. ................................................. 15/316 R
[58] Field of Search .......... 15/312 A, 316 R, DIG. 2; 118/305, 307, 323, 680; 134/123, 45; 239/590.5, 592, 593, 598, 600; 251/4, 7, 8

[56] References Cited

U.S. PATENT DOCUMENTS

| | | | |
|---|---|---|---|
| 1,761,721 | 6/1930 | Gipe | 251/8 |
| 2,250,117 | 7/1941 | Noblitt et al. | 251/8 |
| 4,161,801 | 7/1979 | Day et al. | 15/316 R |
| 4,365,393 | 12/1982 | Hauffe et al. | 138/99 |

Primary Examiner—Philip R. Coe
Assistant Examiner—Arthur D. Dahlberg
Attorney, Agent, or Firm—Reising, Ethington, Barnard, Perry & Milton

[57] ABSTRACT

An apparatus 10 for stripping fluid from the surface of a vehicle including a flexible inflatable bag 12 including an elongated bag inlet 14 having a predetermined cross-sectional area and an elongated opening at one end thereof defining a nozzle 16 and a plenum (20), the bag inlet 14 being mounted on the plenum 20 for the flow of air from the plenum 20 into the bag 12. A pair of bag-retaining rods 30 extend the length of the bag inlet 14 on each side thereof and saddle members 32 are disposed between the retaining rods 30 for positioning the retaining rods (30). The assembly is characterized by including a hinging control rod 50 and adjustable connecting members 52, 54 for connecting the hinging control rod 50 to a first of the retaining rods 30 and adjacent to the outer surface 34 of the saddle members 32 and against the opposite side of the bag 12 relative to the first retaining rod 30 to vary the position of the hinging control rod along the outer surface 34 of the saddle members 32 to engage the bag 12 at varying degrees, thereby selectively varying the cross-sectional area of the bag inlet 14.

8 Claims, 4 Drawing Figures

ADJUSTABLE CLAMP FOR FLUID STRIPPING BAG

TECHNICAL FIELD

The instant invention relates to an apparatus for stripping fluid from the surface of an object and, more particularly, to means for selectively varying the hinging action of a flexible inflatable fluid stripping bag.

BACKGROUND ART

Fluid stripping apparatuses including a flexible inflatable bag mounted about an opening of an air duct or plenum and having a nozzle at the opposite end thereof provide an effective means for removing fluid from a vehicle, while also providing an energy efficient alternative to the prior art. The bag is flexible so as to pivot about a hinging point upon contact by the passing vehicle as the nozzle engages the vehicle surface. The hinging action is modified by selectively varying the cross-sectional area of the bag at the hinging point; that is, if the area is made smaller, then the bag will be pivotted about the hinging point by a lesser degree of applied force.

The U.S. patent application Ser. No. 338,577 filed Jan. 8, 1982 teaches a means for varying the hinging action of the bag by providing a clamp about the bag at the hinging point. The clamp disclosed therein includes adjustable seating means requiring disassembly of the clamping frame for adjustment thereof. A second clamping configuration, disclosed in U.S. patent application Ser. No. 378,957 (P-308) filed May 17, 1982 in which applicant is named as a co-inventor, is adapted to be used to control the hinging action of a secondary bag mounted on a primary bag. The disclosed assembly utilizes straps connected to the primary bag for retaining a clamping assembly against the hinging point of the secondary bag. Neither of the aforementioned patents discloses a hinging clamp including a pair of retaining rods extending the length of the bag about the plenum opening and a third hinging control rod and means for adjustably connecting the hinging control rod to one of the retaining rods so as to clamp the bag therebetween as the hinging control rod is retained against the outer surface of the seating means, the seating means retaining the retaining rods about the bag. Consequently, the hinging action of the bag which is directly connected to the plenum, can be adjusted during the operation of the assembly by adjustment of the connecting members without disassembling the bag from the plenum.

STATEMENT OF THE INVENTION

According to the present invention, there is provided an apparatus for stripping fluid from the surface of an object including an inflexible inflatable bag, the bag including an elongated bag inlet having a predetermined cross-sectional area and an elongated opening at one end thereof defining a nozzle and a plenum, the bag inlet being mounted on the plenum for flow of air from the plenum into the bag. A pair of retaining rods extend the length of the opening on each side thereof. Seating means are disposed between the retaining rods for positioning the rods, the seating means having an outer surface. Hinging control means selectively vary the cross-sectional area of the bag inlet. The instant invention is characterized by the hinging control means including a hinging control rod and adjustable connecting means for connecting the hinging control rod to one of the retaining rods and adjacent to the outer surfaces of the seating means and against the opposite side of the bag to vary the position of the hinging control rod along the outer surface of the seating means to engage the bag at varying degrees thereby selectively varying the cross-sectional area of the bag inlet.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
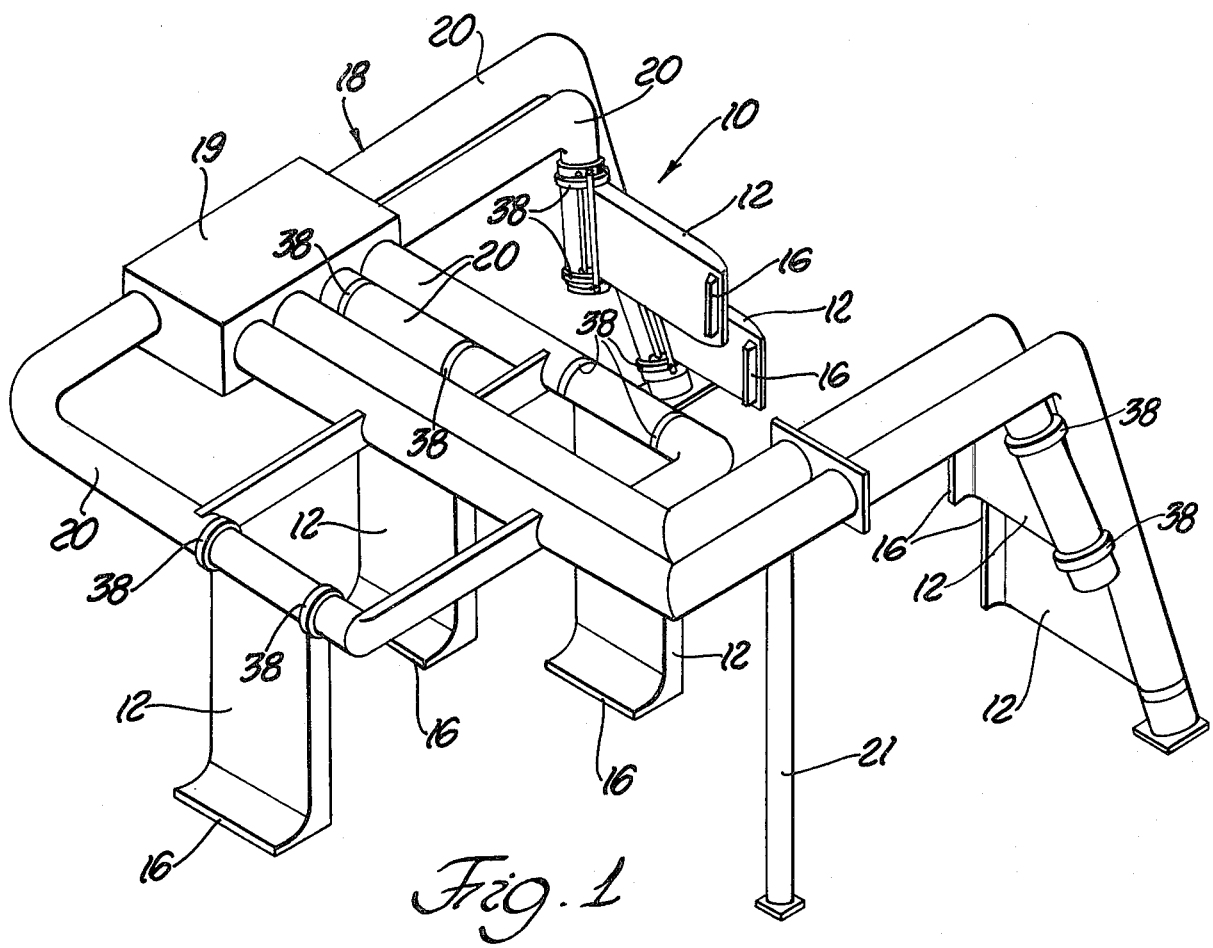
FIG. 1 is a perspective view of a drying station in a car wash system constructed in accordance with the instant invention.
Figure 2:
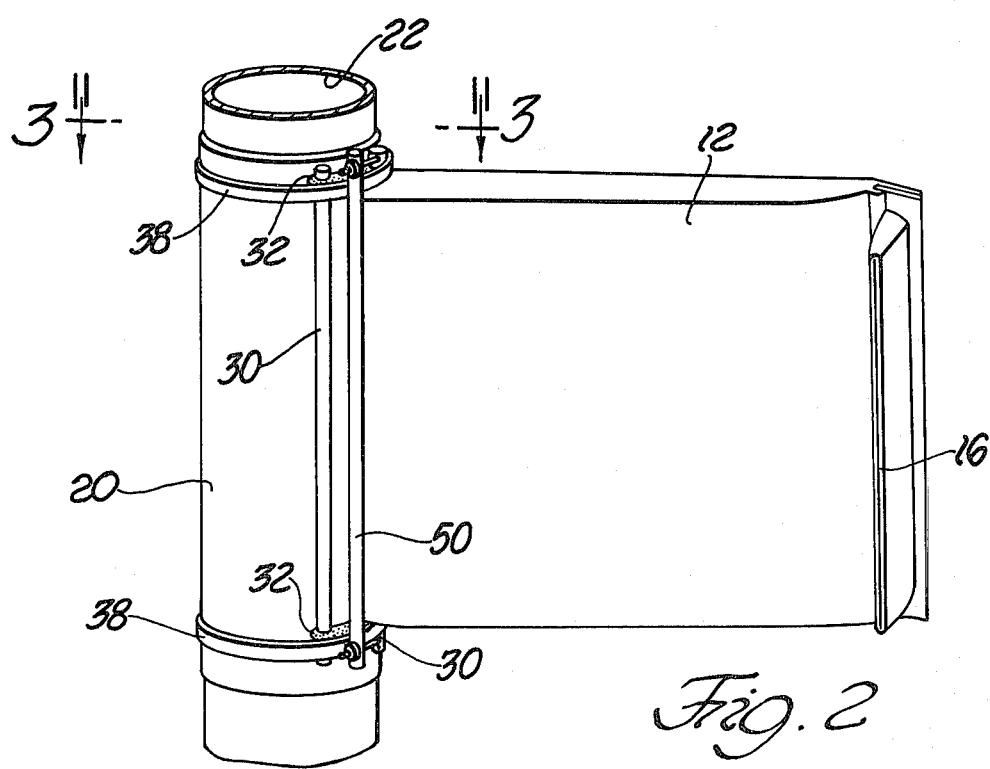
FIG. 2 is a fragmentary perspective view of a flexible bag connected to a plenum by a clamping apparatus constructed in accordance with the instant invention.
Figure 3:
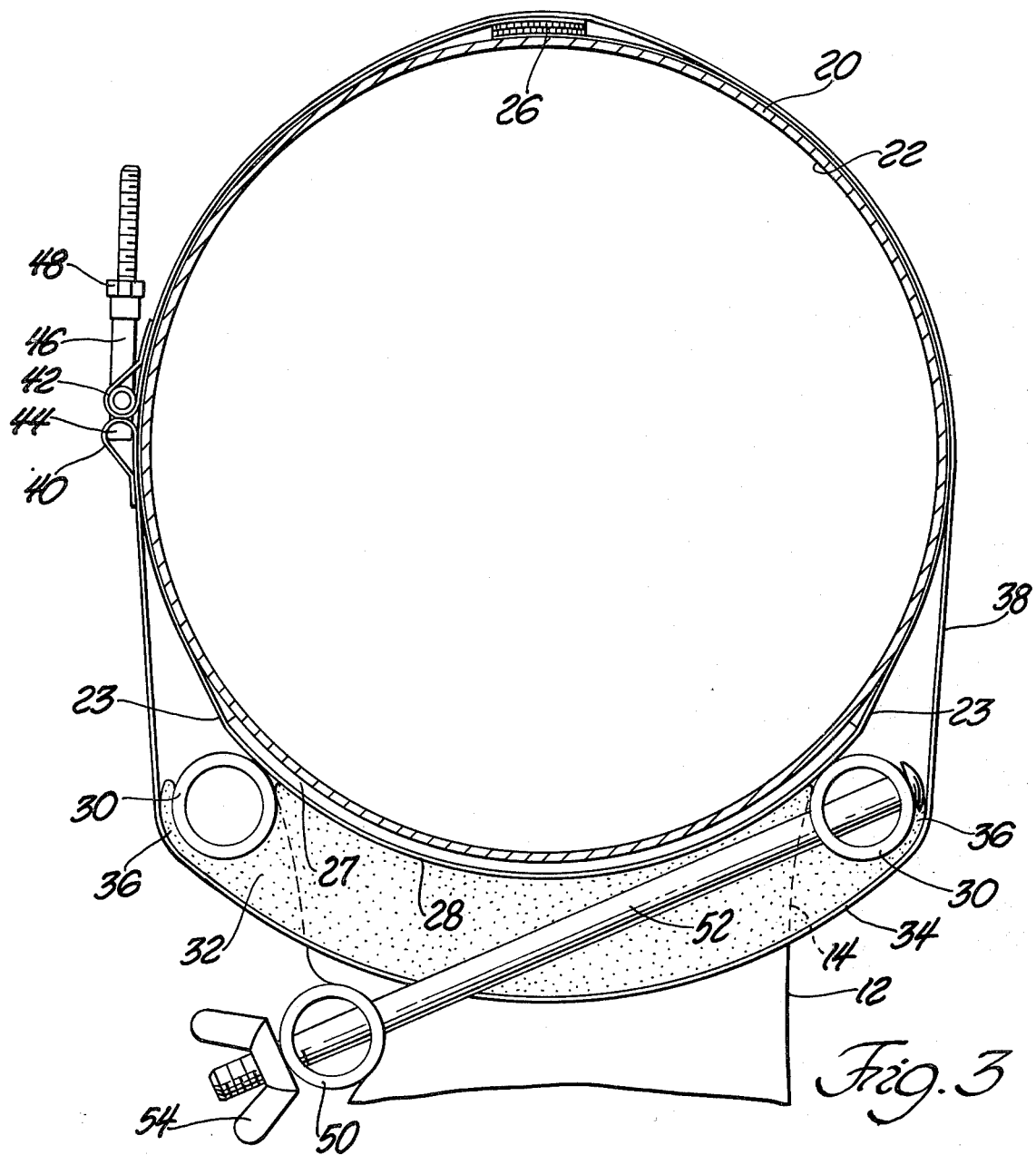
FIG. 3 is an enlarged cross-sectional view of the instant invention taken substantially along lines 3—3 of FIG. 2.
Figure 4:
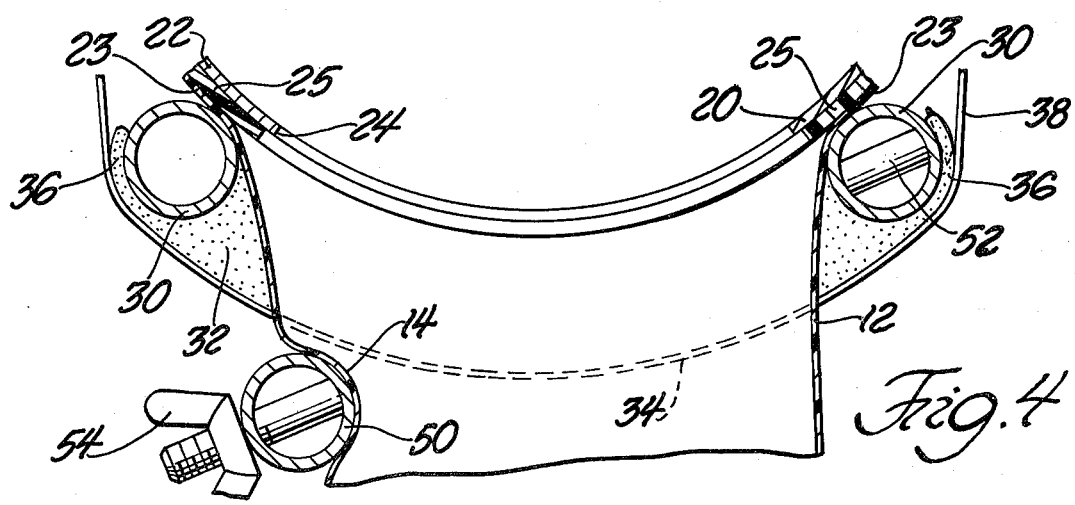
FIG. 4 is a an enlarged cross-sectional view through the transverse center of the instant invention.

A drying station of a car wash system for stripping fluid from the surface of a vehicle is generally shown at 10 in FIG. 1. The car wash system 10 includes a plurality of flexible inflatable bags 12 which are essentially similar in that they are made from a flexible sheet of material, such a thin plastic or cloth. The pieces of material are sewn together to form a desired shape. Each bag 12 includes an elongated bag inlet 14, as shown in FIGS. 3 and 4. The bag inlet 14 has a predetermined cross-sectional area. An elongated opening is at the other end of the bag 12 defining a nozzle 16. The nozzle 16 is adapted to emit a stream of air when the bag 2 is inflated. The nozzle 16 may be a plastic member attached to the bag 12.

The bags 12 are supported by an air distributor system, generally indicated at 18, in FIG. 1. The system 18 includes a plurality of overhead ducts or plenum 20 which may be supported by the ceiling super structure of the building which houses the car wash system 10. Alternatively, support posts 21 may be utilized to support the assembly. A fan system 19 is operatively connected to the plenum 20. Each plenum 20 has a chamber 22 therein and an opening 24 therethrough, as shown in FIG. 4. The bag inlet 14 is releasably mounted about the opening 24 for communication of air thereinto. Each bag includes a first pair of flanges 23 extending along the length of the bag inlet 14 and a second pair of flanges 28 extending along the width of the bag inlet 14. Sealing strips 25 and 27 are disposed between the flanges 23 and 28 and the plenum 20 respectively. The flanges 23 extend about or wrap around the plenum 20 and the ends thereof are secured together by a suitable fastening means 26, such as Velcro. A bag 12 is removed for repair, adjustment or replacement by releasing the Velcro connection.

A pair of bag-retaining rods 30 extend along the length of the bag inlet 14 on each side thereof. Seating means, in the form of a pair of saddle members 32, are disposed between the retaining rods 30 for positioning the rods against the first pair of flanges 23 and about the bag inlet 14 while each saddle member 32 engages one of the flanges 28. Each saddle member 32 has a substantially arcuate outer surface 34 and an internally arcuate lip portion 36. The lip portion 36 extends from each end of the saddle member 32 defining an arcuate seating surface for supporting a portion of the respective one of the retaining rods 30 while allowing rotation of the retaining rods 30 within the seating surface.

A band member 38 extends about each of the saddle members 32 and the plenum 20 for securing the saddle member 32 and the retaining rods 30 supported by the saddle member 32 about the bag inlet 14. Fastening means releasably secure the band members 38 about each of the saddle members 32 and retaining rods 30. More specifically, the band member 38 includes cuffed end portions 40 and 42. The head of a bolt 44 is secured within the end portion 40 and a guiding sleeve 46 is secured within the end portion 42. A nut member 48 releasably secures the bolt 44 within the sleeve 46. When assembled, the band member 38 is secured so as to tightly engage the outer surface 34 of one of the saddle members 32 thereby conforming to the arcuate shape of the outer surface 34 of saddle member 32.

The assembly includes hinging control means for selectively varying the cross-sectional area of the bag inlet 14. In other words, a change in the cross-sectional area of the bag inlet 14, as varied by the hinging control means, changes the resistance to hinging action of the bag 12. The assembly is characterized by the hinging control means including a hinging control rod 50 and adjustable connecting means comprising a bolt 52 and wing nut 54 for connecting the hinging control rod 50 to a first or one of the retaining rods 30 and adjacent to the outer surface 34 of the saddle members 32 and against the opposite side of the bag 12 from the first retaining rod 30 to vary the position of the hinging control rod 50 along the outer surface 34 of the saddle member 32 so as to engage the bag 12 at varying degrees thereby selectively varying the cross-sectional area of the bag inlet 14. More particularly, at least one of the retaining rods 30 or the first rod 30, that being the retaining rod 30 connected to the hinging control rod 50, has an end portion extending outwardly beyond the saddle members 32. The hinging control rod 50 also has end portions extending outwardly beyond the saddle members 32. Each bolt member 52 extends through openings in the extended end portions of the retaining rod 30 and hinging control rod 50, the nut member 54 being disposed on the bolt member 52 to connect together the extending end portions of the retaining rod 30 to the respective end portions of the hinging control rod 50 to force the hinging control rod against the bag 12 to a predetermined extent. In other words, as the wing nut 54 is moved further onto the bolt 52, the hinging control rod 50 engages the bag 12 to a greater degree thereby decreasing the effective cross-sectional area of the bag inlet 14 and decreasing the necessary force to pivot the bag 12 about the hinging point thereof. As the wing nut 54 is tightened, the hinging control rod 50 is forced along the outer surface 34 of the saddle member 32 which changes the angular relation between the bolt 52 and retaining rod 30. In other words, as the nut 54 is tightened so as to force the hinging control rod 50 into the bag 12, the bolt 52 pivots relative to the retaining rod 30. As stated above, the retaining rod 30 rotates within the arcuate surface of the lip 36 thereby allowing the bolts 52 to pivot during the adjustment of the hinging control rod 50.

In operation, the bags 12 are first connected to the plenums 20 about the openings 24 and sealing strips 25 and 27 by connecting the Velcro portions 25 together. The rod members 30 and saddle members 32 are assembled together to provide a retaining frame about the inlet 14 of the bags 12 and are mounted on the plenum 20 so as to clamp the flanges 23 of the bag 12 between the rod members 30 and the sealing strips 25 and to further clamp the flanges 28 between the saddle members 32 and sealing strips 27. The retaining rods 30 and saddle members 32 are secured in position by fastening the band member 38 about the saddle members 32 and plenum 20. The hinging rod 50 is then secured to one of the retaining rods 30. During operation of the assembly, the wing nut 54 is adjusted upon the bolt 52 so as to vary the hinging action of the bag 12 until a desired position is obtained. Thusly, the hinging rod 50 and connecting means 52, 54 of the instant invention provide an effective means for varying the hinging action of the bag 12 during the operation of the assembly. As conditions change within the drying system 10, the hinging action of the bag 12 can be further adjusted without the necessity of dismantling the bag 12 from the plenum 20 and shutting down the operation of the drying system 10. By not having to disassemble the bag 12 and not having to shut down the assembly, the instant invention provides an efficient means for varying the hinging action of the bag 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An apparatus (10) for stripping fluid from the surface of an object, said apparatus (10) comprising: a flexible inflatable bag (12) including an elongated bag inlet (14) having a predetermined cross-sectional area and an elongated opening at one end thereof defining a nozzle (16); a plenum (20), said bag inlet (14) being mounted on said plenum (20) for the flow of air from said plenum (20) into said bag (12); first and second bag-retaining rods (30) extending the length of said bag inlet (14) on each side thereof; seating means (32) disposed between said retaining rods (30) for positioning said retaining rods (30) and having an outer surface (34); and hinging control means for selectively varying said cross-sectional area of said bag inlet (14) and characterized by including a hinging control rod (50) and adjustable connecting means (52, 54) for connecting said hinging control rod (50) to said first retaining rod (30) and adjacent to said outer surface (34) of said seating means (32) and against an opposite side of said bag (12) relative to said first retaining rod (30) to vary the position of said hinging control rod (50) along said outer surface (34) of said seating means (32) to engage said bag (12) at varying degrees to selectively vary said cross-sectional area of said bag inlet (14).

2. An assembly as set forth in claim 1 further characterized by said adjustable connecting means including a bolt member (52) extending through said first retaining rod (30) and said hinging control rod (50), said adjustable connecting means further including a nut member (54) disposed on said bolt member (52) to force said hinging control rod (50) against said bag (12) to a predetermined extent.

3. An assembly as set forth in claim 1 further characterized by said first retaining rod (30) having end portions extending outwardly beyond said seating means (32), said hinging control rod (52) having end portions extending outwardly beyond said seating means (32), said adjustable connecting means (52, 54) connecting together said extending end portions of said first retaining rod (30) to respective end portions of said hinging control rod (50).

4. An assembly as set forth in claim 1 further characterized by said seating means including a pair of saddle members (32) having a substantially arcuate outer surface (34) and an internally arcuate lip portion (36) extending from each end thereof and defining an arcuate seating surface for supporting a portion of a respective one of said retaining rods (30).

5. An assembly as set forth in any one of claims 2, 3 or 4 further characterized by including a band member (38) extending about of said seating means (32) and said plenum (20) and fastening means for releasably securing said band members (38) thereabout.

6. An adjustable clamp apparatus for selectively varying the hinging action of a flexible inflatable fluid-stripping bag (12) including an elongated bag inlet (14) having a predetermined cross-sectional area and a nozzle (16) at one end thereof wherein the bag inlet (14) is mounted about the opening (24) of a plenum (20), said apparatus including: a pair of bag-retaining rods (30); seating means (32) for supporting said rods (30) about the bag (12) at the bag inlet (14) and having an outer surface (34); fastening means (38) for fastening said seating means (32) and said retaining rods (30) to the plenum (20), and characterized by including a hinging control rod (50) and adjustable connecting means (52, 54) for adjustably connecting said hinging control rod (50) to one of said retaining rods (30) and adjacent to said outer surface (34) of said seating means (32).

7. An assembly as set forth in claim 6 further characterized by said adjustable connecting means including a bolt member (52) extending through said one of said retaining rods (30) and said hinging control rod (50), said adjustable connecting means further including a nut member (54) disposed on said bolt member (52) to force said hinging control rod (50) against said bag (12) to a predetermined extent.

8. An assembly as set forth in claim 6 further characterized by said seating means including a pair of saddle members (32) having a substantially arcuate outer surface (34) and an internally arcuate lip portion (36) extending from each end thereof defining an arcuate seating surface for supporting a portion of a respective one of said retaining rods (30) while allowing rotation of said retaining rods (30).

* * * * *